United States Patent
Niemi (12) 
(10) Patent No.: US 6,318,425 B1
(45) Date of Patent: Nov. 20, 2001

(54) DELIMBING DEVICE AND A METHOD IN A DELIMBING DEVICE

(75) Inventor: Petri Niemi, Tampere (FI)

(73) Assignee: Timberjack Oy, Tampere (FI)

( * ) Notice: Subject to any disclaimer, the term of this patent is extended or adjusted under 35 U.S.C. 154(b) by 0 days.

(21) Appl. No.: 09/786,838

(22) PCT Filed: Sep. 10, 1999

(86) PCT No.: PCT/FI99/00733

§ 371 Date: Mar. 9, 2001

§ 102(e) Date: Mar. 9, 2001

(87) PCT Pub. No.: WO00/15025

PCT Pub. Date: Mar. 23, 2000

(30) Foreign Application Priority Data

Sep. 15, 1998 (FI) .................................................. 981982

(51) Int. Cl.⁷ .............................. A01G 23/08; B27B 1/00
(52) U.S. Cl. .................. 144/343; 144/4.1; 144/24.13; 144/338; 144/357
(58) Field of Search ................. 144/4.1, 24.13, 144/338, 343, 357; 126/34

(56) References Cited

U.S. PATENT DOCUMENTS 4,094,452  6/1978  Makela .................................. 226/34
5,957,177 * 9/1999 Smith et al. ...................... 144/343 X

FOREIGN PATENT DOCUMENTS

| 3112573 | 6/1982 | (DE) . |
| 58576 | 9/1977 | (FI) . |
| WO 9203040 | 3/1992 | (WO) . |

* cited by examiner

*Primary Examiner*—W Donald Bray
(74) *Attorney, Agent, or Firm*—Quarles & Brady LLP (57) ABSTRACT

The invention relates to a method in a delimbing device (1), which delimbing device (1) comprises a frame structure (2), at least one supporting means (3a, 3b, 3c) attached in the frame structure (2) in a movable (5a, 5b, 5c) manner to support the tree-truck (S) and to exert a first force effect ($F_0$) on the tree-trunk (S), actuator means (9) to control the position of the supporting means (3a, 3b, 3c) to maintain the first force effect ($F_0$) exerted by the supporting means (3a, 3b, 3c) on the tree-trunk (S). In the method the second force effect (F) exerted by the tree-trunk (S) to the frame structure (2) is measured with sensor means (12) arranged in connection with the frame structure (2) and to change the second force effect (F), the first force effect ($F_0$) is adjusted by utilizing the information obtained from the measurement.

10 Claims, 5 Drawing Sheets

DELIMBING DEVICE AND A METHOD IN A DELIMBING DEVICE

The invention relates to a method in a delimbing device according to the preamble of claim 1. The invention also relates to a delimbing device according to the preamble of claim 7.

As is well known, a harvesting head, i.e. a multifunctional grapple, coupled to a harvester, i.e. a multifunctional machine, is used for processing of tree-trunks, the function of which grapple is to grip the vertically growing tree, to crosscut the tree and to bring it into a substantially horizontal position to be further processed. For this purpose, the multifunctional grapple is coupled in an articulated manner to a boom construction in the multifunctional machine, and the necessary actuators, typically hydraulic cylinders and hydraulic motors are connected therein, and by means of them it is possible to utilize the position of the multifunctional grapple and its different functions. The multifunctional grapple, which in the description hereinbelow will also be referred to as a delimbing device, typically comprises means provided in pairs for supporting the tree-trunk, wherein these means are typically equipped with delimbing members for delimbing the branches at the same time when the tree-trunk is driven through the multifunctional grapple in the longitudinal direction of the tree-trunk. For this purpose, the multifuctional grapple is typically provided with feed rolls or feed tracks functioning by means of hydraulic motors and pressing themselves against the trunk, pulling the trunk past delimbing blades by means of friction. The multifunctional grapple can also be provided e.g. with spring-loaded auxiliary delimbing blades, to improve the delimbing quality throughout the tree-trunk. The multifunctional grapple may also be provided with another pair of supporting means for supporting the tree-trunk, and it is also possible to connect delimbing member thereto. The multifunctional grapple is also provided with a chainsaw by means of which the tree-trunk is crosscut into a desired length by stopping the feeding of the trunk and by activating the sawing. After the crosscutting, the feeding of the tree-trunk proceeds, until the entire tree-trunk has been processed.

One above-described device is presented in the patent publication EP 0 473 686-B1, which device is provided with four delimbing members arranged in pairs to move in an articulated manner, and also with one auxiliary delimbing member fixed immovably in the frame structure. This stationary delimbing member also comprises a supporting surface against which the tree-trunk is pressed by means of the first pair of delimbing members. The delimbing blades are closed and opened by means of a hydraulic cylinder coupled therebetween in an articulated manner. There are also known devices, in which the tree-trunk is pressed against the frame structure of the device by means of delimbing blades, the frame structure being provided with a supporting surface against which the tree-trunk slides at the same time during the delimbing process. Thus, the auxiliary delimbing member, which is connected to the frame in an articulated manner, can be arranged to move with respect to the frame structure and to be pressed against the tree-trunk e.g. by means of spring force. A delimbing device equipped with a mobile, spring-loaded auxiliary delimbing member is disclosed for example in the patent publication EP 0 346 308-B1, and in the corresponding U.S. Pat. No. 4,898,218. In the latter solution, the supporting means and the delimbing members attached thereto are, however, locked in an immovable manner into a particular position by means of cylinders, and the position is changed only when it is discovered that the diameter of the tree-trunk has decreased a predetermined amount. Thus, the supporting means are closed a desired amount, wherein the position of the tree in the delimbing device is changed.

In the multifunctional grapples coupled to multifunctional machines, the tree-trunk which is placed in a substantially horizontal position is typically processed in such a way that the articulation of the frame structure of the multifunctional grapple and the delimbing blades is located above the tree-trunk, wherein the opening of the delimbing members and the supporting means makes the tree-trunk fall downwards. There are also known devices for processing elongated tree-trunks, which correspond to the multifunctional grapple and in which the crosscut trunks are lowered with a working machine, such as a crane, and the above-described operations are conducted. However, in these devices the frame structure and the articulations are placed below the tree-trunk, and the delimbing members are opened upwards, wherein the weight of the tree-trunk does not have the tendency to open the delimbing blades, and the tree-trunk rests on the frame of the device.

In the apparatus coupled to the multifunctional device the aforementioned supporting surface is located against the upper surface of the tree-trunk when the tree-trunk is in a horizontal position. The supporting means press the tree-trunk against the supporting surface by means of hydraulic cylinders, wherein at the same time said supporting surface forms a fixed reference surface for determining the diameter of the tree-trunk. As is well known, the position of the delimbing blades and the supporting means is used for measuring the diameter, for example by utilizing a sensor recognizing the position of the hydraulic cylinder used for closing and opening the delimbing blades and the supporting means. There are known linear sensors which indicate the range of the piston rod of the hydraulic cylinder. The articulation of the delimbing blades can also be equipped with sensors, e.g. a potentiometer, which sensor indicates the rotation of the joint when compared to their reference position. By placing the sensors inside the joints, a durable structure is attained which is protected even against demanding environmental conditions. By means of the control system of the multifunctional machine, it is possible to determine the diameter of the tree-trunk calculatorily on the basis of the position of the supporting means, at the same time presuming that the tree-trunk is positioned against the reference surface, i.e. the supporting surface. This information is used together with the results of the length measurement to calculate and report the processed quantities of timber, the generated costs, the volume of the quantity of timber as well as the basis for the provisions. Thus, it is obvious that this causes extremely high demands for the accuracy of the measurement, so that the information on the processed quantities of timber would be as accurate as possible.

One factor which causes errors in the diameter measurement is that when the tree is processed in horizontal position, the weight of the tree-trunk causes the opening of the downward directed supporting means, wherein at the same time the tree-trunk is detached from the reference surface. When the diameter is determined on the basis of the position of the supporting means, the diameter is thus interpreted to be too large. Thus, the user of the multifunctional machine typically increases the pressure level of the actuators of the supporting means to a high level so that the force effect of the supporting means would be sufficient in different situations to support the tree-trunk and to press it against the reference surface as disclosed in the patent publication EP 0 473 686-B1.

However, because of the raised pressure level, the supporting means and the delimbing members tend to be pressed against the tree-trunk with an unnecessarily strong force during the delimbing, especially as the tree-trunk becomes thinner from down below to the top and in the direction of delimbing. When the tree-trunk becomes thinner, the loading caused by the same on the delimbing device is decreased when the weight is reduced and the tree is transferred during the delimbing.

When the delimbing blades are strongly pressed against the tree-trunk, the necessary friction forces for feeding the tree-trunk through the device are also increased. Thus, the forces required by the feed rolls are increased and at the same time the feed rolls have to be pressed harder against the tree-trunk to attain sufficient friction, or more efficient friction means have to be arranged in the feed rolls. Along with the higher forces, the friction forces of the components are also increased and a larger portion of the efficiency of the devices is utilized to overcome these friction forces. The consequences also include an increase in the damages of the tree-trunk, a weakening of the quality and large, efficient components.

In different seasons, the softness of the surface structures of the tree-trunk varies, which increases the liability for damages. During the delimbing of the tree-trunk the user has to otherwise control the delimbing device and the working machine, and thus the pressure levels and their fluctuation limits are typically set for the entire tree-trunk at the same time, generally they are set constant for each diameter area. Typically, the pressure level is set unnecessarily high, so that there would be no errors in the diameter measurement, and the tree-trunk would always be supported with a sufficient force even at varying conditions. The consequences are, however, the above-described problems.

The selection of the pressure levels conducted by the user for different situations is difficult, and the best result is based on the long-term experiences of the user him/herself. When the seasons and weather conditions change, the density of the wood material, the softness of the surface section of the wood, the structure of the surface section, the amount of resin and the humidity also change, and thus it takes a considerably long time before the user adjusts to the different conditions and before a good delimbing result is attained by means of the delimbing device. Other effective factors include the variations in the shape of the tree-trunk, the number of branches to be delimbed and the variations in their size, as well as for example the dirtiness of the tree-trunk. It is difficult even for an experienced user to be prepared for the changes in the conditions, and it may take a considerable amount of time to determine the conditions and to find the pressure levels in each working location, which can result in wood material of bad quality as well as in a bad delimbing result at the initial working stages.

The purpose of the present invention is to elimate the above-described drawbacks, thereby improving the state of art prevailing in the field. To attain these purposes, the method according to the invention in a delimbing device is primarily characterized in what will be presented in the characterizing part of the appended claim 1. The delimbing device according to the invention is primarily characterized in what will be presented in the characterizing part of the appended claim 7.

With the invention, several considerable advantages are achieved, by means of which for example the processing of tree-trunks is accelerated and becomes more effective, and the damages in the tree-trunks are avoided. A central principle of the invention is to measure the force exerted by the tree-trunk on the delimbing device, on the basis of which correcting measures are conducted either by the user or by the control system of the device. With the invention it is also possible to control the position of the tree-trunk as well as the forces exerted thereon considerably better than in prior art.

The user adapts to different conditions and learns to use the device considerably faster when compared to prior art, when it is indicated for the user, according to a preferred embodiment of the invention, that the force effect exerted by the tree-trunk on the delimbing device is changed, especially that it is reduced below the determined minimum value, and/or increased above the determined maximum value. On the basis of this indication the user can conduct the necessary correction measures, for example the user can set the pressure of the delimbing blades and the supporting means into a suitable value. The pressing force of the supporting means can be set to a level, which, on one hand is sufficiently high for holding the tree-trunk, and on the other hand sufficiently low to avoid too high pressing forces and friction forces exerted on the tree-trunk.

A further advantage is that with the information given by means of the indication or otherwise in connection with the same, the users obtain further information on the system, wherein the device can be used more effectively and it is possible to learn to use the device and make correct estimations faster in different conditions. When necessary, the tree-trunk can be driven through the delimbing device again to conduct diameter measurement, it the force effect of the tree-trunk has disappeared entirely, and thus the information obtained from the measurement of the tree-trunk is more reliable. In addition, the work is accelerated, because the test drives for testing the pressure levels set by the user as well as the re-checkings for measurement corrections can be abandoned or the number of these processes can be considerably reduced.

Another considerable advantage of the invention is that the position of the tree-trunk with respect to the delimbing device remains substantially constant. For example the shape of the delimbing members is optimized in such a way that when the diameter of the tree-trunk varies, and when the tree-trunk is supported against the stationary supporting surface of the delimbing device, the position of the delimbing blades enables an efficient and even delimbing result all over the tree-trunk. The change of the position is monitored in a simple manner by examining whether the value of the force effect is lower or higher than the set threshold value.

According to a preferred embodiment of the invention, the pressure control of the actuators of the delimbing device can also be implemented automatically by the control system of the delimbing device. Thus, on the basis of the information received from the measurement of the force effect, the control system adjusts the pressure level as well as the position of the components affecting the supporting means. The adjustment is continued until the desired force effect exerted on the delimbing device by the tree-trunk and at the same time the desired position of the tree-trunk is achieved. Thus, a considerable advantage is that it is not necessary for the user to take care of the selection of the pressure levels for different diameters of the tree-trunk, but the user can concentrate on the control of other functions of the delimbing device and the working machine to which the delimbing device is coupled. This also results in a system, which functions faster than prior art to correct error situations.

The advantage of the invention is also that the pressure level of the actuator means for different diameters of the tree-trunk can be adjusted in a stepless manner. Thus, a pressure adjustment which is considerably more accurate than the one pressure level determined for each diameter area. By adjusting and monitoring the pressure, the power consumption of the delimbing device can also be considerably reduced when compared to prior art.

In the following description, the invention will be described by means of some preferred embodiments with reference to the appended drawings in which.

Figure 1:
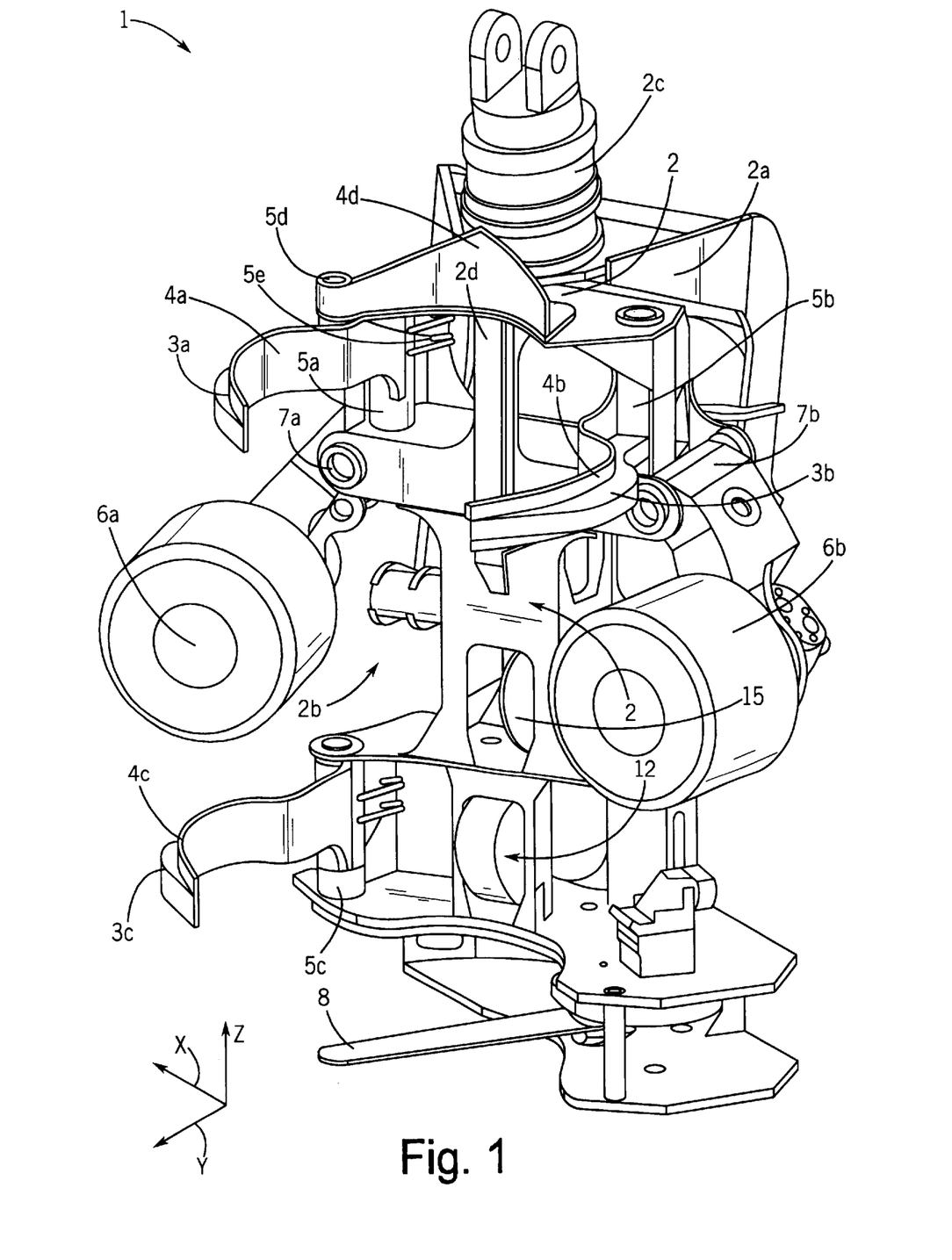
FIG. 1 shows a perspective view of a delimbing device known as such in an upright position, the invention being applied in connection with the device.

With reference to FIG. 1, a delimbing device 1 known as such comprises a frame structure 2. To couple the delimbing device 1 to the boom assembly (not shown in the drawing) of a working machine, e.g. a harvester, known as such, the device 1 also comprises a fixing structure 2a, which is attached to the frame structure 2 in a movable manner by means of an articulation 2b. With reference to FIG. 1, the device 1 is shown in a substantially upright (arrow Z) position, wherein by means of the articulation 2b and the fixing structure 2a, the frame structure 2 is arranged to rotate around a substantially horizontal (arrow X) direction. In the upper part of the fixing structure 2a, a fixing and rotating means 2c, such as a rotator 2c, is also arranged, to fix the device 1 in the end of the boom assembly of the working machine. By means of the fixing and rotating means 2c, the frame structure 2 is arranged to rotate around a substantially vertical (arrow Z) direction together with the fixing structure 2a.

The device 1 also comprises a first supporting means 3a and a second supporting means 3b, which are fixed in a movable manner to the frame structure 2 by means of articulations 5a and 5b. In the position according to FIG. 1 of the device 1, the supporting means 3a and 3b are arranged to rotate around a substantially vertical (arrow Z) direction. The supporting means 3a and 3b are also equipped with delimbing members 4a and 4b to delimb the tree-trunk in a way known as such. The device 1 also comprises feeding means 6a and 6b, advantageously feed rolls 6a and 6b, which are placed against the tree-trunk to be delimbed and which utilize the driving effect exerted on the tree-trunk to pull the tree-trunk past the delimbing blades 4a and 4b to delimb the branches in the tree-trunk by means of the same. The feed rolls 6a and 6b are fixed in a movable manner to the frame structure 2 by means of articulations 7a and 7b, with which the feed rolls 6a and 6b are arranged to rotate around a substantially horizontal (arrow Y) direction with reference to FIG. 1.

The device 1 is in the position according to FIG. 1 when the tree-trusnk extending substantially in the vertical (arrow Z) direction is gripped by means of the device 1, wherein the supporting means 3a and 3b as in well as the feed rolls 6a and 6b are advantageously in their outermost position according to FIG. 1, to place the tree-trunk against the supporting surface 2d functioning as a reference surface of the frame structure 2. The supporting surface 2d is advantageously a plate-like metal plate 2d which in the position of the device according to FIG. 1 extends substantially in the vertical (arrow Z) direction and is integrated in the frame structure 2, the tree-trunk being held against the supporting surface 2d and sliding against the same during the delimbing process. The supporting surface 2d is advantageously located between the supporting means 3a and 3b. It is obvious that the reference surface can also be another surface or means, such as a wheel or a roll, against which the tree-trunk is pressed.

The device 1 also comprises cutting means 8 for cutting a standing tree-trunk which is to be delimbed. The cutting means 8, advantageously a chain saw 8, also conduct the cutting of the tree-trunk in parts of fixed length when it is supported by the supporting means 3a, 3b in a substantially horizontal (arrow Y) direction. Thus, when compared to the position of FIG. 1, the frame structure 2 has rotated substantially 90 degrees around the articulation 2b, wherein the supporting means 3a and 3b are directed substantially downwards in the vertical (arrow Z) direction, and for example the supporting surface 2d extends substantially in the horizontal (arrow Y) direction. To support the tree-trunk, the supporting means 3a and 3b are at least partly closed, wherein the supporting means 3a abuts on the tree-trunk on the opposite side of the tree-trunk with respect to the supporting means 3b. The supporting means 3a and 3b and their delimbing blades 4a and 4b have a curved shape so that they would conform with the shape of the tree-trunk as well as possible to delimb the branches on both side surfaces as well as on the bottom surface of the tree-trunk. In the above-described position the frame structure 2 with its supporting plates 2d is thus located primarily above the tree-trunk in the vertical (arrow Z) direction, and the supporting means 3a and 3b are primarily located on the sides of the tree-trunk and below the same. The device 1 also comprises an auxiliary delimbing member 4d, which, by means of an articulation 5d and in the position of the device 1 according to FIG. 1, is arranged to rotate around a substantially vertical (arrow Z) direction. To delimb the upper surface of the tree-trunk, the auxiliary delimbing member 4d is pressed against the tree-trunk with its own weight or for example by means of a spring force or an actuator, such as a pressurized medium operated cylinder. When the tree-trunk is supported with the device 1 in a substantially horizontal (arrow Y) position, the auxiliary delimbing member 4d is primarily located above the tree-trunk.

The device 1 also comprises a measuring wheel 15 for measuring the length of the tree-trunk during the delimbing. The measuring wheel 15 is also utilized to determine how long a distance the tree-trunk has been fed in the delimbing device 1, wherein the delimbing at the desired point can be performed by means of the cutting means 8. This measuring wheel 15 is arranged in connection with the frame structure 2 by means of an articulation known as such and for example a spring-loaded supporting arm, with which the measuring wheel 15 is arranged to follow the surface on the upper edge of the tree-trunk in a way known as such.

With reference to FIG. 1, the device 1 also comprises a lower supporting means 3c with its lower delimbing blades 4c for supporting the tree-trunk at least from one side. The lower supporting means 3c is fixed to the frame structure 2 by means of an articulation 5c, wherein in the position according to FIG. 1, the lower supporting means 3c is arranged to rotate around a substantially vertical (arrow Z) direction. The lower supporting means 3c is arranged for supporting the tree trunk and keeping it stationary during the sawing, when the sawing is conducted by means of a sawing movement conducted by the cutting means 8 transversely through the tree-trunk. In the position of FIG. 1, the cutting means, advantageously a chain saw, is arranged to rotate around a substantially vertical (arrow Z) direction. The supporting means 3a and 3b are located advantageously close to each other in the longitudinal direction of the tree-trunk, which in the position of the device 1 according to FIG. 1 corresponds to the substantially vertical (arrow Z) direction, and the lower supporting means 3c is arranged in a distance therefrom. In the device 1 according to FIG. 1, the feed rolls 6a and 6b are arranged substantially on the opposite sides of the tree-trunk to exert an even traction on the tree-trunk. It is obvious that the lower supporting means 3c can be paired with a second lower supporting means, and there are also known apparatuses which lack the lower supporting means altogether.

Figure 2A:
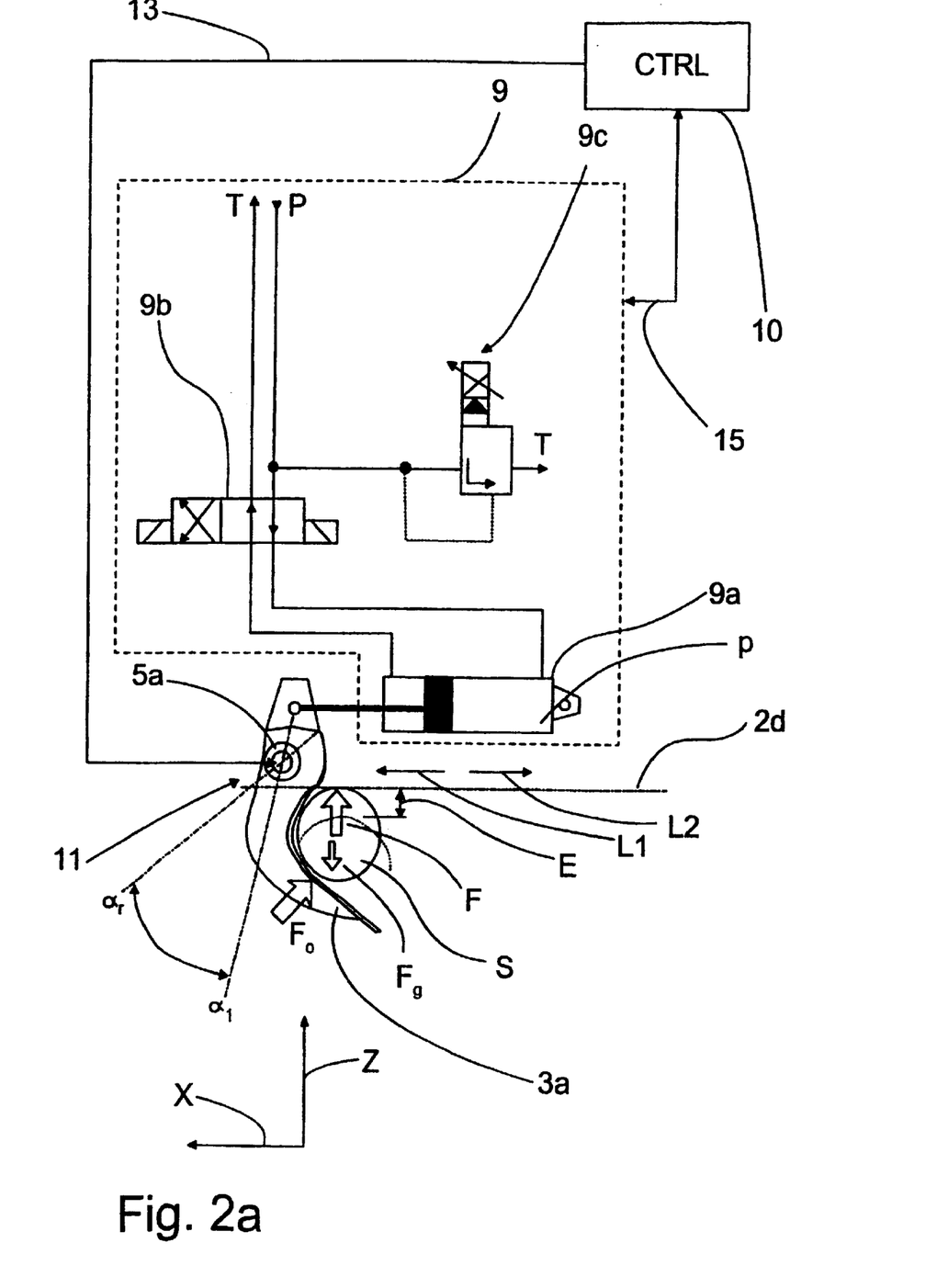
FIG. 2a is a principle view illustrating the function of the supporting means and actuator means of the delimbing device of FIG. 2.

In the delimbing process, the tree-trunk is moved substantially horizontally in its longitudinal direction, wherein the branches first strike against the delimbing blades 4a, 4b and 4d, and are cut off. Simultaneously by means of the supporting means 3a and 3b the tree-trunk is pressed against the frame structure 2, advantageously a supporting surface 2d. In the honzontal position of the tree-trunk the weight of the tree-trunk tends to open the supporting means 3a and 3b, wherein, to prevent the falling of the tree-trunk, their actuator means 9, e.g. a pressurized medium operated cylinder 9a is used to maintain a torque for example in the joint 5d, to keep the supporting means 3a in the desired position. FIG. 2a presents a simple, advantageous embodiment of the actuator means 9. By means of the torque a sufficient force is attained for supporting the weight of the tree-trunk and a sufficient auxiliary force for pressing the tree-trunk against the supporting surface 2d, wherein the position of the tree-trunk can be maintained substantially constant.

Figure 2B:
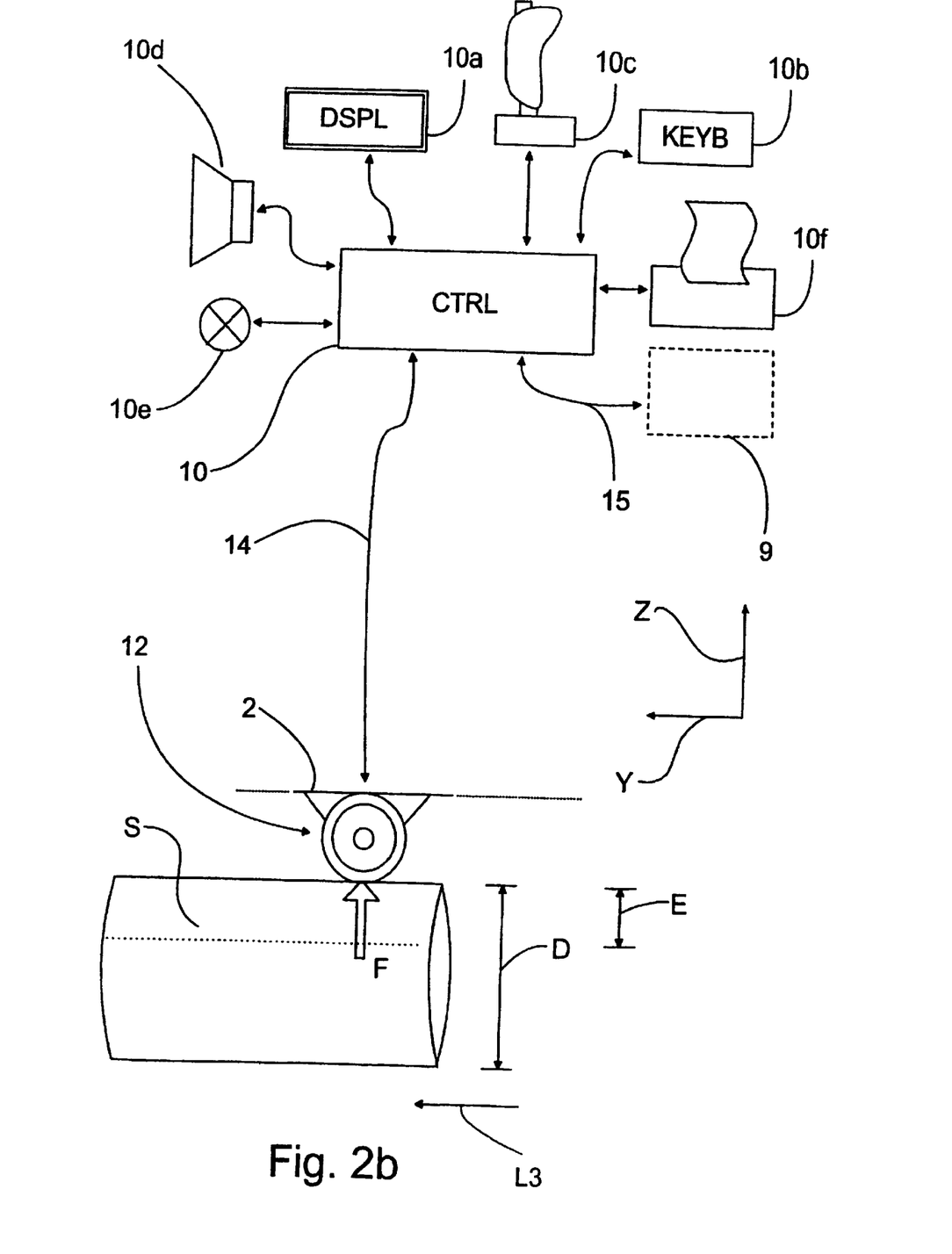
FIG. 2b shows a perspective view of the device and method according to a preferred embodiment of the invention, applied in connection with the delimbing device of FIG. 1.

FIGS. 2a and 2b are reduced skeleton diagrams illustrating the function of the delimbing device 1. FIG. 2b shows a sideview of the tree-trunk S at the location of the sensor means 12, and in FIG. 2a at the location of the supporting means 3a when seen from the end. Furthermore, in FIGS. 2a and 2b, an axis of coordinates illustrates the position of the horizontally (arrow Y) placed tree-trunk S and the device 1 during the delimbing when compared to the position according to FIG. 1. FIG. 2a also illustrates an advantageous embodiment of the actuator means 9. The control system 10 is in a way known as such connected to different devices for example to transmit signals 13, 14 and 15 between the devices and the control system 10. Typically the signal in question is an analog and/or digital electric signal, which is amplified, filtered, processed and coded according to the requirements of the devices used at a time. The signals 13, 14 and 15 can also be transferred in a wireless manner, for example by utilizing radio waves, wherein the device 1 comprises the necessary transmitters and receivers.

With reference to FIGS. 2a and 2b, the force effect $F_0$ exerted on the tree-trunk S by the supporting means can be described by means of an equation $k \cdot F_0 = Fg + F$, in which Fg is the force effect caused by the tree-trunk, which opens the supporting means 3a and is directed downward. The force F is a force effect exerted by the tree-trunk S on the frame structure 2. By means of a variable coefficient k, the portion of the force effect $F_0$ divided between two or more supporting means, as well as the portion of the force effect $F_0$ which is exerted on the tree-trunk S in a direction perpendicular to the force effect Fg, are taken into account. Other effective fobes, such as friction forces, can also be taken into account. The presented dependency is linear, but typically the dependency between the force effects is of the form $F = f(Fg, F_0, k)$, wherein the second force effect F is a function of the first force effect $F_0$. The coefficient k is effected for example by the mechanical structure of the supporting means 3a, and by the friction factors. Furthermore, a dependency $F_0 = f(p)$ is affected between the pressure level p and the force effect $F_0$ of the actuator means 9, wherein the first force effect $F_0$ is dependent on the pressure p, and the dependency is affected e.g. by the mechanical structure of the supporting means as well as by the length of the tension indicators formed. By means of the presented dependencies, it is thus possible to form the required control algorithm, wherein by adjusting the pressure level p, the second force effect F is also affected. Advantageously, the force effect F affects in a substantially vertical (arrow Z) direction when the tree-trunk S is positioned horizontally. According to the dependency, the force effect $F_0$ exerted by Fe supporting means 3a on the tree-trunk S is utilized both for supporting the tree-trunk S (to reverse the force effect Fg) and for producing the desired force effect F. Advantageously, the force effect set to a minimum value $F_1$, the dependency $F > F_1$ is maintained, wherein the force effect F is greater than the minimum value $F_1$. Additionally, or alternatively, a maximum value $F_2$ can be set, and a dependency $F < F_2$ can be maintained, wherein the force effect F is smaller than the maximum value $F_2$. The situation, where the value of the force effect F is zero corresponds to a situation where the force effect $F_0$ is exactly sufficient for supporting the tree-trunk in its position. Thus, the tree-trunk S can be in contact with the supporting surface 2d without the force effect, or it can be located within a distance from the supporting surface 2d.

The above-presented dependencies and threshold values are stored in the control system 10 to effect the control algorithm of the device 1, by means of which control algorithm for example the pressure of the actuator means 9, e.g. the cylinder 9a, and the volume flow supplied thereto is adjusted by means of pressure valve means 9c and directional valve means 9b. It is obvious that the motion of the supporting means 3a can also be effected in other ways, for example by means of a torque motor arranged in the articulation 5a. In the control system 10, a computing algorithm is also stored to determine the diameter D of the tree-trunk S on the basis of a dependency described hereinbelow.

The tree-trunk S is pressed against the frame structure 2, and at the same time against the supporting surface 2d, when the supporting means 3a and 3b support the tree-trunk between these means and the frame structure 2. The pressing is due e.g. to the first force effect $F_0$ exerted by the supporting means 3a on the tree-trunk S. Also when the diameter D and thus also the weight of the tree-trunk S varies during the infeed, the tree-trunk advantageously abuts on the supporting surface 2d to attain the correct diameter. Advantageously, the reference surface 2d and the supporting means 3a are located on the same line in the transverse direction (arrow X) of the tree-trunk, so that the position error caused by the hanging other end of the tree-trunk would not affect the result of the diameter measurement, or the measurement of the force effect F, described hereinbelow.

The cylinder 9a, for example the hydraulic cylinder 9a affects the articulation 5a of the supporting means 3a so that the means can be moved in a way known as such. The supporting means 3a and 3b can also be controlled by means of a common cylinder 9a, whose end is coupled in connection with the articulation 5a of the supporting means 3a, with reference to FIG. 1, to a bracket 5e, and the opposite end is coupled in connection with the articulation 5b of the supporting means 3b. Thus, the position of the supporting means 3a and 3b is controlled by changing the length of one cylinder 9a and the supporting force is controlled by adjusting the pressure level of the cylinder 9a with the actuator means 9. Advantageously, the supporting force, i.e. the first force effect $F_0$ is adjusted in such a way that the distance of the upper surface of the tree-trunk S with respect to the supporting surface 2d remains substantially constant, advantageously they remain in an immediate contact with each other.

With reference to FIG. 2a during the delimbing of the tree-trunk S, at least in the articulation 5a of the second supporting means 3a, first sensor means 11 known as such are attached to determine the position of the supporting means 3a. This position is determined e.g. as an angular position $\alpha_1$ of the supporting means 3a with respect to a reference position $\alpha_1$ which can vary. By means of this angular position $\alpha_1$, it is also possible to determine the diameter D of the tree-trunk, wherein a particular angular position corresponds to a particular diameter. Advantageously, the angular position is calculatorily directly proportional to the diameter, for example $D=\alpha_1 \cdot k$, and thus $D=f(\alpha_1, k)$, in which k is a coefficient. Thus, the presumption is that the tree-trunk S is located against the supporting surface 2d. In FIG. 2a the supporting surface 2d is presented as a reduced reference level 2d. Thus, it is obvious that when the distance between the tree-trunk and the reference level is increased, the angular position $\alpha_1$ of the supporting means 3a is also changed, wherein the diameter of the tree-trunk S is interpreted to be larger than it actually is. Advantageously, the auxiliary delimbing member 4d and the supporting means 3a and 3b are located close to each other, so that the section in the tree-trunk against which the member 4d is pressed, and the sections against which the supporting means 3a and 3b are pressed would be close to each other. Thus, the position error caused by the hanging other end of the tree-trunk S has a smaller effect on the measuring result.

Further referring to FIG. 2a, the actuator means 9 for controlling the position of the supporting means 3a as well as the force effect F advantageously comprise a hydraulic cylinder 9a, directional valve means 9b for selecting the direction (arrow L1 and L2) of motion of the piston in the cylinder 9a and pressure valve means 9c, advantageously at a proportional pressure valve 9c, to set the pressure level p of the cylinder 9a. The actuator means 9 are connected to a pressure and volume flow source P and to a return line T. The actuator means 9 comprise e.g. control electronics known as such to control the same by means of the control and adjustment signal given by the control system 10.

The control system 10 is for example a data processor, such as a computer or programmable logic, which is utilized to control the working machine and which comprises memory means known as such to store the above-described dependencies and the control algorithms. It is obvious that according to the requirements of different embodiments, the control system can be divided in a way known as such into several sub-systems which are connected to each other, but in this description the control system is presented as a single unit for the sake of clarity.

The control system 10 is connected to a display 10a for presenting information for the user, to a keyboard 10b for entering the pressure level set by the user into the control system 10, to a control rod 10c for controlling the function of the device 1, to a speaker 10d for giving signals to the user, to a printer 10f for printing reports and measured data, and advantageously also to a signal light 10e for giving light signals to the user. By means of the peripheral devices 10a—10e it is possible to provide the user with signals and information which can be perceived with senses. The control system 10 is also connected to the first sensor means 11 to determine the diameter D of the tree-trunk S.

Figure 3:
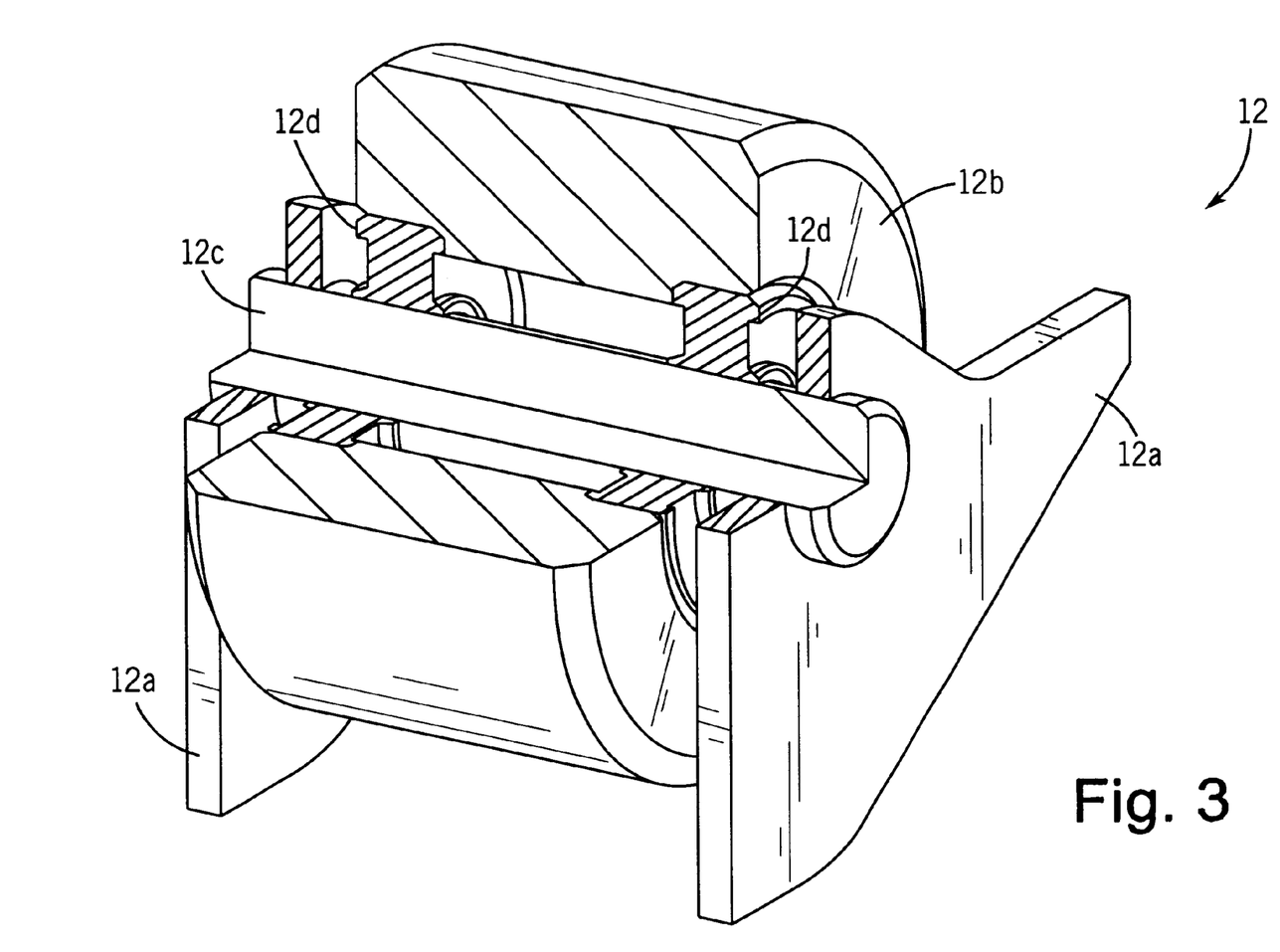
FIG. 3 shows a perspective view of sensor means according to a preferred embodiment of the invention, partly cut open for measuring the force effect.

According to a preferred embodiment of the invention and with reference to FIG. 2b, the device 1 is also provided with second sensor means 12 to determine the pressing force, i.e. the force effect F of the tree-trunk S exerted on the frame structure 2. With reference to FIG. 3, according to a preferred embodiment of the invention, the sensor means 12 comprise a roll 12b integrated in connection with the frame structure 2 of the device 1 by means of a frame part 12a, against which roll 12b the tree-trunk S is supported according to FIG. 2b when the tree-trunk S is moving (arrow L3) during the delimbing. The second sensor means 12 comprise a force sensor (not shown in the drawing), advantageously a strain-gauge, which is placed advantageously on the axle 12c of the roll 12b to measure the force effect F exerted on the roll 12a. The second sensor means 12 also comprise a bearing arrangement 12d, such as a rolling bearing or a slide bearing. Advantageously, the force F is continuously measured in a stepless manner to initiate correction measures when necessary. The second sensor means 12 are connected to the control system 10.

The supporting means 3a, 3b maintaining the pressing force and the second sensor means 12 measuring the force effect F are located substantially on the same line in the transverse direction of the tree-trunk S, so that the measurement error caused by the position error of the tree-trunk S would be as small as possible. The error in the measurement of the force F is caused for example by the hanging other end of the tree-trunk S, wherein the longitudinal direction of the tree-trunk S deviated substantially for example from the direction (arrow Y) of the supporting surface 2d. Advantageously the roll 12a of the second sensor means 12 is located between the supporting means 3a and 3b in connection with the supporting surface 2d functioning as a reference level or in connection with the frame structure 2. With reference to FIG. 1 and according to a preferred embodiment of the invention, the roll 12a is located close to the lower supporting means 3c in the frame structure 2.

On the basis of the facts presented above, it is obvious that the sensor means 12 can also be located in connection with the supporting surface 2d in such a way that the force sensor is used to measure the force effect F exerted by the tree-trunk S on the supporting surface 2d. Thus, it is possible to arrange the measurement of the force effect F also without the above presented roll 12a. According to another example, the sensor means 12 can be placed in connection with the auxiliary delimbing members 4d to measure the force effect F exerted thereon by the tree-trunk S. The sensor means 12 can also be arranged in connection with an articulation 5d to measure the torque effected by the force effect F. Thus, the auxiliary delimbing member 4d can be arranged substantially immobile with respect to the frame structure 2. The articulation of the auxiliary delimbing member 4d can also be arranged in such a way that the motion of the member 4d is substantially linear, advantageously transverse with respect to the tree-trunk S.

According to FIG. 2b, the control system 10 is connected to the second sensor means 12. On the basis of the signal received from the sensor means 12, the control system 10 controls the actuator means 9 according to a preferred embodiment of the invention, wherein when the pressing force F is reduced e.g. below a minimum value $F_1$ set by the user, the pressure level (pressure p) of the cylinder 9 is automatically increased on the basis of the control algorithm. When the pressing force F disappears entirely, the gravity (force effect Fg) and the yielding supporting means 3a may have caused the descending of the tree-trunk S so low, that the distance E between the reference level 2d and the upper surface of the tree-trunk S has grown so large that the diameter D calculated on the basis of the angular position of the supporting means 3a is erroneous. It is also possible to teed the maximum value $F_2$ of the pressing force F into the control system 10, which maximum value $F_2$ should not be exceeded by the force F measured with the sensor means 12. On the basis of the description hereinabove, too large a force F entails larger friction forces and drawbacks of prior art caused thereby. When the pressing force F exceeds for example the maximum value $F_2$ set by the user, the pressure level of the cylinder 9a is reduced by means of an automatic adjustment until the desired level of the pressing force F is attained. The maximum value $F_2$ and the minimum value $F_1$ can be determined for each diameter area separately by the user when pressure levels of prior art are used. In case of an automatic and stepless control, these values can be determined to apply to all diameter sizes. These values can also be determined as an allowed minimum or maximum deviation from the set pressure level.

According to a preferred embodiment of the invention, the control system 10 indicates for the user the deviation of the force F outside set threshold values, for example by means of a light signal, a sound signal, a signal appearing on the display 10a or by means of a signal which can be otherwise perceived with senses. Thereafter the user can set the pressure level of the actuator means 9 on a higher level by means of the control system 10 so that the contact between the tree-trunk S and the roll 12a would be maintained, and the pressing force F would remain sufficient. Correspondingly, the user can set the pressure level on a lower level so that the pressing force F would be lower than the desired one to avoid the above-described drawbacks. The minimum value $F_1$ or the maximum value $F_2$ of the pressing force F is given to the control system for example by means of the keyboard 10b.

According to a preferred embodiment of the invention, the second sensor means 12 are used to control the force effect F exerted by the tree-trunk S on the frame structure 2, in such a way that the it is only monitored whether the value of the force F is lower than a determined threshold value. This threshold value, for example a threshold value $F_3$ is given to the control system 10 by the user. The used threshold value is for example the minimum value $F_3$ of the force F, and when the value is lower than this, it indicates that the tree-trunk is detached from the supporting surface 2d functioning as a reference level, wherein the diameter measurement is no longer reliable. Correspondingly, it is possible to determine only the maximum value $F_4$ of the force F, which, when exceeded, signifies too large forces. In other words, the aim is to keep the tree-trunk S in the desired, advantageously fixed position with respect to the delimbing device 1 and its frame structure 2. The aim is to maintain the position of the tree-trunk S during the delimbing when the diameter and the weight of the tree-trunk varies. It is indicated for the user if the minimum value is lower than the set value, whereafter it is possible to increase the pressure levels and the diameter measurement can be conducted again. By means of the function the user can set the pressure values on a level by means of which on one hand, the above-described drawbacks are avoided, and on the other hand, a reliable diameter measurement is attained by means of the first sensor means 11. Furthermore, it is obvious that both the user and the control system 10 can take care of the control together and separately. It is also obvious that the user can give the threshold values to the control system 10 in numerous different ways, for example by selecting the menus displayed on the display 10a by means of the control rod 10c, which menus present the force effects by means of symbols. After these symbols have been selected or the different directive numerical values have been entered from the keyboard 10b, the control system 10 takes care of the measurement and control of the force effects.

Figure 4:
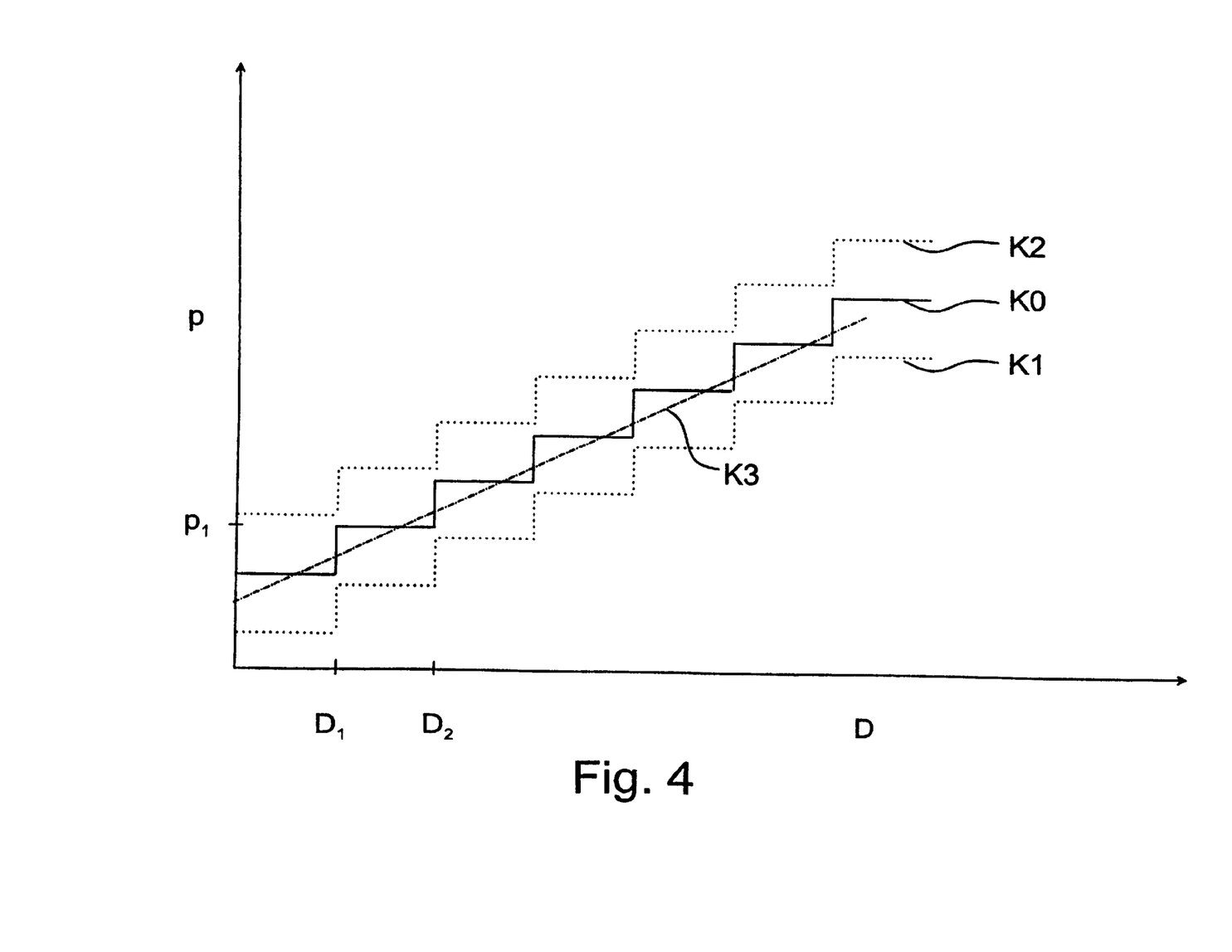
FIG. 4 shows schematically the placement of the pressure levels of the actuator means according to an embodiment of the delimbing device of FIG. 1.

FIG. 4 also illustrates the process of setting the pressure level p of the cylinder 9a for different diameter areas of the tree-trunk S. One diameter area is formed between D1 and D2, in which the pressure level is set into a value $P_1$. For each area it is also possible to set the pressure level separately according to a curve K0, but when one pressure level is changed, the other pressure levels can also change a corresponding amount at the same time. The differences in the pressure levels can be fixed or they can deviate from each other. The control system 10 takes care of changing the pressure level on the basis of the diameter measurement. Heretofore, it was very difficult to determine the correct pressure levels for different conditions, but by means of the present invention it is possible to attain considerable advantages. According to the invention, when the control system 10 indicates the situation of the pressing force F to the user, the user can reduce the pressure to comply with a curve K1 or increase the pressure levels to comply with a curve K2. When the control system 10 adjusts the pressure level automatically according to the invention by means of the above-described control algorithm, this pressure level is determined most advantageously in a stepless manner and continuously for each diameter D according to a curve K3, wherein a considerably more accurate control is attained when compared to prior art. The pressure level p according to the curve K3 is determined by means of the above-described control algorithm by utilizing the information obtained from the measurement of the force effect F.

According to the invention, the pressure level according to the curve K3 is also adjusted by taking into account the changes in the weight of the tree (also when the diameter remains constant but the density of the tree varies) and for example to restrict the force effect F in the way described above. Thus, the pressure according to curve K3 is set in accordance with the fact that the second force effect F remains between the above-described minimum and maximum values or is greater than the set minimum value. In the drawing, the curve K3 is shown in a linear manner, but the curve K3 which describes the dependency of the pressure from the diameter can also deviate from the linear one, especially in different conditions.

It is also obvious for anyone skilled in the art that even though the description above illustrates the invention in connection with an advantageous delimbing device, it is obvious that it can also be applied in several other delimbing devices within the scope of the claims.

What is claimed is:

1. In a method of operating a delimbing device having a frame structure;

at least one supporting means attached to the frame structure in a moveable manner to support the tree-trunk and to exert a first force effect on the tree-trunk; and actuator means for controlling the position of the supporting means to maintain the first force effect exerted by the supporting means on the tree-trunk;

the improvement wherein:

a second force effect exerted by the tree-trunk on the frame structure is measured with sensor means arranged in connection with the frame structure; and the first force effect is adjusted by utilizing the information obtained from the measurement to change the second force effect.

2. A method according to claim 1, wherein an indication is given to the user in a manner which can be perceived with senses to adjust the first force effect when the second force effect is higher than a set maximum value and/or lower than a minimum value.

3. A method according to claim 1, wherein the first force effect is adjusted to maintain the second force effect below the set maximum value and/or above the set minimum value.

4. A method according to claim 1, wherein in the control system of the device information is stored at least of the dependency between the first force effect and the second force effect to adjust the force effects by means of a control algorithm stored in the control system.

5. A method according to claim 1, wherein the second force effect is adjusted by controlling the pressure level of the actuator means.

6. A method according to claim 1, wherein the second force effect is measured by means of a sensor arranged in connection with the roll of the sensor means, on which roll the tree-trunk abuts on the support of the supporting means.

7. In a delimbing device which comprises:

a frame structure;

at least one supporting means attached in the frame structure in a movable manner to support the tree-trunk and to exert a first force effect on the tree-trunk;

actuator means for controlling the position of the supporting means to maintain the first force effect exerted by the supporting means on the tree-trunk; and a control system connected at least to the actuator means to control the same;

the improvement wherein the delimbing device also comprises:

sensor means arranged in connection with the frame structure to measure the second force effect exerted by the tree-trunk on the frame structure, and wherein the sensor means are connected to the control system to transmit the information obtained from the measurement.

8. A delimbing device according to claim 7, wherein:

the device also comprises peripheral devices connected to the control system;

the peripheral devices are arranged so that the user can provide the control system with the maximum value and/or the minimum value of the force effect; and the peripheral devices are arranged to indicate to the user that the force effect is higher than the maximum value and/or lower than the minimum value.

9. A delimbing device according to claim 7, wherein in the control system information is stored at least of the dependency between the first force effect and the second force effect, to control the force effects by means of the control algorithm stored in the control system.

10. A delimbing device according to claim 7, wherein the sensor means comprise a roll on which the tree-trunk abuts on the support of the supporting means, and a sensor arranged in connection with the roll to measure the second force effect exerted by the tree-trunk on the roll.

* * * * *